United States Patent [19]

Dunks et al.

[11] 4,115,521
[45] Sep. 19, 1978

[54] PROCESS FOR THE SYNTHESIS OF DECABORANE(14)

[75] Inventors: Gary Burr Dunks, Peekskill; Kathy Palmer Ordonez, Eastchester, both of N.Y.

[73] Assignee: Union Carbide Corporation, New York, N.Y.

[21] Appl. No.: 813,073

[22] Filed: Jul. 5, 1977

Related U.S. Application Data

[63] Continuation-in-part of Ser. No. 668,859, Mar. 22, 1976, abandoned, which is a continuation of Ser. No. 436,663, Jan. 25, 1974, abandoned.

[51] Int. Cl.$^2$ ............................................. C01B 35/18
[52] U.S. Cl. .................................... 423/294; 423/295
[58] Field of Search ....................... 423/294, 295, 286

[56] References Cited

U.S. PATENT DOCUMENTS 3,458,531  7/1969  Aftandnian ..................... 423/286 X

OTHER PUBLICATIONS

Chamberland et al.; "Inorg. Chem.", vol. 3, 1969, pp. 1450–1456.
"Journ. Am. Chem. Soc.", vol. 88, 1966, pp. 4728–4729.

*Primary Examiner*—G. O. Peters
*Attorney, Agent, or Firm*—Richard G. Miller

[57] ABSTRACT

Decaborane (14) is prepared by the chemical oxidation of the tetradecahydroundecaborate (−1) ion with an oxidant having an electrode potential (E°) of at least +0.6 volts.

7 Claims, No Drawings

PROCESS FOR THE SYNTHESIS OF DECABORANE(14)

RELATED APPLICATIONS

This application is a continuation-in-part of application Ser. No. 668,859, filed Mar. 22, 1976, which is in turn a continuation of application Ser. No. 436,663, filed Jan. 25, 1974 both now abandoned.

The present invention relates in general to the preparation of decaborane (14), $B_{10}H_{14}$, and more particularly to the process for preparing decaborane (14) by the chemical oxidation of the tetradecahydroundecaborate (−1) ion, $B_{11}H_{14}^-$.

Decaborane (14), due in part to its relative stability and its normally solid state, is one of the most useful of the boron hydrides. Despite considerable investigation by a number of workers in the field over the last thirty years or so the heretofore proposed processes for the preparation of decaborane (14) involve principally pyrolytic or high pressure reactions using lower boron hydrides such as diborane (6) or tetraborane (10). Processes of this type are disclosed in U.S. Pat. No. 2,987,377, Faust et al., issued June 6, 1961, U.S. Pat. No. 2,968,534, G. F. Judd, issued Jan. 14, 1961 and U.S. Pat. No. 2,989,374, J. A. Neff, issued June 20, 1961. A non-pyrolytic method involving the reaction of an alkali metal pentaborane (8) with diborane (6) at temperatures below −20° C. is disclosed in U.S. Pat. No. 3,489,517, Shore et al., issued Jan. 13, 1970. Although some improvements have been attained by these investigations, the state of the art prior to the present invention was such that it was not possible to prepare decaborane (14) efficiently on a commercial scale without the need for elaborate equipment and the use of potentially hazardous reagents.

We have now discovered an improved process wherein decaborane (14) is prepared from a stable higher borohydride salt by a single step oxidation reaction using conventional oxidants. The process can be carried out at ambient room temperatures and at ordinary atmospheric pressure in the simplest of chemical apparatus. Accordingly, safe and economical commercial scale operation is now feasible.

In its broad aspect the present process comprises contacting and oxidizing the $B_{11}H_{14}^-$ ion at a temperature between −10° and 50° C. with an oxidizing agent having an electrode potential (E°) of at least +0.6 volts.

The tetradecahydroundecaborate (−1) ion can either be generated in situ in the reaction mixture or incorporated therein in the form of a source compound such as a salt which is to at least a slight degree soluble in the reaction medium. A number of these compounds are well known and can be readily prepared by prior published processes. $NaB_{11}H_{14}$ was reported to be produced by the reaction of ethereal $B_2H_6$ and $NaB_{10}H_{13}$ at 45° C. by V. D. Aftandilian et al. ("Inorganic Chemistry," Vol. 1, No. 4, 734-737 (1962)). $LiB_{11}H_{14}$ was similarly prepared. Both salts were isolated as etherates, $NaB_{11}H_{14} \cdot 2.5$ dioxane and $LiB_{11}H_{14} \cdot 2$ dioxane. These etherates dissolve readily in water and from metathesis reactions, crystalline nonsolvated cesium, tetramethylammonium, trimethyesulfonium and trimethylammonium salts can be isolated in accordance with the Aftandilian report. Another synthesis procedure in which a hydride ion source and a boron hydride, e.g. $NaBH_4 + B_2H_6$, are reacted in a solvent medium such as dioxane to form the corresponding $B_{11}H_{14}^-$ salt is reported by H. C. Miller et al. in "Inorganic Chemistry," Vol. 3, No. 10, 1456-1462 (1964). In this reaction the $B_2H_6/NaBH_4$ molar ratio should be kept well below stoichiometric requirements to avoid unduly rapid or violent reactions.

A preferred mode of operation is to produce the $B_{11}H_{14}^-$ ion in situ by the method set forth in our co-pending application Ser. No. 668,859, filed Mar. 22, 1976. In general, this procedure comprises contacting in a solvent medium, and at a temperature of from 100° to 120° C., an octahydrotriborate, having the formula $MB_3H_8$ wherein M is preferably an alkali metal or an alkylonium cation, with a substantially equimolar amount of $BF_3$. The $BF_3$ is preferably added to the octahydrotriborate in the solvent medium at a relatively slow rate to avoid a temperature increase of more than about 5° C. Thereafter the $B_{11}H_{14}^-$ ion produced is oxidized to decaborane by contact with an oxidation agent.

The oxidation agents suitably employed in the process can be any of the compounds, ions or radicals which exhibit an electrode potential (E°) of at least +0.6 volts, and preferably at least +1.0 volts. Specific agents of this class include sodium permanganate, potassium permanganate, potassium dichromate, chromic acid, oxalic acid, peracetic acid, perbenzoic acid, sodium hypochlorite, benzoyl peroxide, hydrogen peroxide and also aqueous acid solutions containing the following elements, ions or radicals:

$Ag^{+2}/H^+$
$Au^{+3}/H^+$
$Ce^{+4}/H$
$CeOH^{+3}/H^+$
$HClO^-/H^+$
$ClO_3^-/H^+$
$ClO_4^-/H^+$
$Co^{+3}$
$Cr^{+4}/H^+$
$Fe(phenanthroline)_3^{+3}/H^+$
$IO_3^-/H^+$
$MnO_2/H^+$
$NiO_2/H^+$
$Np^{+4}$
$O_2/H^+$
$PbO_2/H^+$
$PbO_2/SO_4^{2-}/H^+$
$Pu^{+4}$
$Pu^{+5}$
$RuO_4$
$Ti^{+3}$
$U^{+5}$
$V(OH)^+$ The oxidization of the $B_{11}H_{14}^-$ ion must, of course, be carried out in a liquid medium which is substantially unreactive toward the oxidants and the boron-containing reagents and products, and which facilitates contact of the $B_{11}H_{14}^-$ ion with the oxidatively active moiety of the oxidation agent. In most cases both the $B_{11}H_{14}^-$ ion source and the oxidant are mutually soluble in an acidified aqueous medium, and accordingly such media are preferred. Since, however, the decaborane (14) product is only slightly soluble in water and is extensively soluble in non-polar organic media such as benzene, hexane, diethylether and the like, isolation of the decaborane (14) product is greatly facilitated by the addition of one of these solvents to the reaction mixture to establish a two-phase liquid medium. In appropriate cases where mutual solubility of the $B_{11}H_{14}^-$ ion source and the oxidant are possible, other suitable solvents include glyme (1, 2-dimethoxyethane), diglyme [bis(2-methoxyethyl) ether], cyclic ethers, diethylcarbitol, tetrahydrofuran and the like.

The temperature of the reaction mixture should not exceed 50° C and can be as low as about −10° C. Preferably, the temperature is between about 5° C and 50° C.

In the absence of boron compounds other than the $B_{11}H_{14}^-$ ion source and the decaborane (14) product it is not essential to exclude air from the reaction system. This is ordinarily the case where the $B_{11}H_{14}^-$ source is prepared apart and purified before being used as a reagent in the oxidation reaction of this invention. When $B_{11}H_{14}^-$ is prepared in situ, however, the possibility of the presence of highly unstable by-products is possible and care should be taken to avoid reaction of these compounds with the atmosphere over the reaction system. The use of inert gases such as helium, neon, methane, nitrogen and the like instead of air is advantageous in these circumstances.

The invention is illustrated by the following examples:

EXAMPLE 1

Synthesis of $B_{11}H_{14}^-$ ion in situ and Conversion thereof to Decaborane (14) by Reaction with Potassium Permanganate Oxidant The 2000 ml, three neck, round bottom flask employed for this experiment was fitted with a dry-ice trap and an ether trap attached to one of the necks. A mechanical stirrer was also connected through the center neck and the remaining neck was connected to a metering pump which led to a reservoir of boron trifluoride diethyletherate. Means also were provided for temperature measurements in the flask as well as the introduction of nitrogen. Commercial grade sodium borohydride and boron trifluoride diethyletherate (98 percent) were employed. The flask was charged with 500 ml of diglyme and 60g (1.59 mol) of $NaBH_4$. The ether trap was cooled with Dry ice/2-propanol, the reaction mixture was heated to 105° C. and boron trifluoride diethyletherate (250 ml, 2.04 mol) was added at the rate of approximately 40 ml/hr. When the addition was complete, the viscous, yellow mixture was allowed to cool to room temperature. The contents of the flask were filtered in air using a medium, porosity frit. The solids were washed with two, 50 ml portions of dry diglyme. The combined diglyme solutions were stripped to a yellow semi-solid using a rotary evaporator and mechanical pump at approximately 57° C. The semi-solid was taken up in 800 ml of water and added to a cooled solution of 100 ml of water, 100 ml of conc. $H_2SO_4$ and 946 ml of benzene contained in a 5,000 ml, 3 neck flask which had been equipped with a $N_2$ inlet, mechanical stirrer and dropping funnel. The flask and contents were cooled to 10° C. in an ice bath and a solution of 53.3g (0.34 mol) of $KMnO_4$ in 1600 ml of water and 160 ml of $H_2SO_4$ was added over approximately 40 min. The contents of the flask were poured into a separatory funnel and the benzene layer separated and washed with 700 ml of water. The benzene solution was dried over $MgSO_4$, filtered and stripped to a yellow oil. The oil was placed into a sublimer, evacuated and heated to 50° C. with the cold-finger cooled with ice. After the residual benzene and diglyme had passed, decaborane (14) collected on the cold finger. Yield 9.13g (0.075 mol, mp 97.5°–98° C.). The infrared, $^{11}B$ nmr and mass spectra were identical to authentic samples.

EXAMPLE 2

Synthesis of $B_{11}H_{14}^-$ ion in situ and Conversion thereof to Decaborane (14) by Reaction with Sodium Dichromate Oxidant In a manner similar to that employed in Example 1, the flask was charged with 500 ml of diglyme and 60.0g (1.59 mol) of $NaBH_4$. The trap was cooled with Dry-ice/2-propanol, while the flask and contents were heated with stirring to 105° C. and $BF_3.O(C_2H_5)_2$ (250 ml, 2.04 mol) was added over a 6 hour period. When the addition was complete the viscous yellow mixture was allowed to cool to room temperature. The trap contained 124g of ethyl ether. The addition apparatus and trap apparatus were removed and a 10 inch Vigreaux column topped with an alembic still head was added. The pressure in the system was reduced to approximately 50 mm/Hg and stirred for 0.5 hours. The flask was heated using a steam bath and the solvent removed by distillation. After approximately 400 ml of solvent had been removed the pressure was reduced to approximately 0.1mm/Hg and an additional 40 ml of solvent was removed. The flask was cooled in an ice bath and a cooled solution of 200 ml of water and 200 ml of conc. $H_2SO_4$ was slowly added. Benzene, 500 ml, was added followed by the slow addition of 118.5g (0.4 mol) $Na_2Cr_2O_7.2H_2O$ in 60 ml of water (approximately 105 ml total) in 1.0 hours. The temperature of the contents of the flask rose to 30° C. When the addition was complete, the organic layer was separated and the aqueous layer was washed with 400 ml of benzene. The combined benzene layers were dried over $MgSO_4$ and filtered. The dried benzene solution (930 ml total) was analyzed and found to be 0.07 molar (7.99g, 0.065 mol) in decaborane (14).

EXAMPLE 3

Synthesis of $B_{11}H_{14}^-$ ion in situ and Conversion thereof to Decaborane (14) by Reaction with Hydrogen Peroxide Oxidant Into a 2000 ml, 3-necked flask (equipped as in Example 1) was placed 500 ml of diglyme and 60.0g (1.59 mol) of $NaBH_4$. The mixture was heated with stirring to 105° C. and 250 ml (2.04 mol) of $BF_3.O(C_2H_5)_2$ was added over a 6 hour period. Heating was continued for one additional hour and the mixture was then allowed to cool to room temperature. The ether trap was replaced with a short column and a still head. The pressure in the system was reduced to 30 mm Hg and 347g of diglyme was removed by distillation using a steam bath. The mixture was cooled to 30° C. and 763 ml of water was added. The mixture was heated to remove (1 atm) 659g of distillate which contained water and diglyme. To the cooled reaction mixture 10° C.) 500 ml of benzene and 130 ml 65 percent $H_2SO_4$/water solution was added, followed by the addition of 135g (1.19 mol of 30 percent) of hydrogen peroxide solution over a 3 hour period. The reaction mixture was allowed to warm to room temperature and stirred for 68 hours. Aliquots of the benzene layer were withdrawn and analyzed for decarborane. The ultimate yield of decaborane (after about 42 hours) was 0.065 mol or 7.99g.

EXAMPLE 4

Synthesis of $B_{11}H_{14}^-$ ion in situ and Conversion thereof to Decaborane (14) by Reaction with Hydrogen Peroxide/Fe (II) Oxidant In the apparatus similar to that described in Example 1, 300 ml of dry diglyme and 60.0g (1.59 mol) of $NaBH_4$ were heated to 105° C followed by the addition of 250 ml (2.04 mol) of 98 percent $BF_3.O(C_2H_5)_2$ over 6 hours. The mixture was heated 1 additional hour then cooled to 20° C. The ether trap was replaced with a concentrator head and water (800 ml) was added. The reaction mixture was heated and distillate was collected until the pot temperature had reached 106° C. An additional 400 ml of water was added and the distillation continued until the pot temperature reached 112° C. To the cooled mixture, 250 ml of hexane, a cool solution of 35 ml of concentrated $H_2SO_4$ in 35 ml of $H_2O$ (62 ml total) and 4.4g of $FeSO_4.7H_2O$ was added. The mixture was heated to 35° C and over 2.75 hours, 72 ml (0.67 mol) of 30 percent $H_2O_2$ was added. The reaction temperature was maintained at 35° ±5° C. throughout the addition (cooling was necessary). When the addition was complete, the mixture was cooled to 25° C. and filtered to remove yellow solids. The filtrate was placed in a separatory funnel and the layers separated. The aqueous layers were washed with 2 × 100 ml portions of hexane. The combined hexane layers were washed with 2 × 100 ml portions of water and dried over anh. $MgSO_4$ and filtered. Colorimetric analysis showed that the solution (1230 ml) contained 0.070 moles, 8.55g of decaborane (14).

EXAMPLE 5

Synthesis of Decaborane (14) from Isolated $B_{11}H_{14}^-$ ion Using Hydrogen Peroxide/Fe (II) Oxidant The $(CH_3)_3HN^+$ cation in sparingly water soluble salt $(CH_3)_3NHB_{11}H_{14}$ was exchanged for $K^+$ cation to yield the very soluble $KB_{11}H_{14}$ and thus render the $B_{11}H_{14}^-$ ion more capable of undergoing oxidation. To a 500 ml Erlynmeyer flask fitted with a magnetic stirring bar was placed 10.6g (0.189 mol) of KOH and 100 ml of water. The solution was cooled and 15.3g (0.079 mol) of pure $(CH_3)_3NHB_{11}H_{14}$ were added and stirred. The mixture was heated to boiling for one hour to allow the evolution of $(CH_3)_3N$ then cooled to 25°, and neutralized to pH 7 by the drop-wise addition of 1:1 $H_2SO_4/H_2O$ solution. The mixture was then placed in a 1000 ml, three-neck flask fitted with a mechanical stirrer, thermometer, gas outlet bubbler and an addition funnel and 4.4g (0.016 mol) of $FeSO_4.7H_2O$, 250 ml of n-hexane and 62 ml of 1:1 $H_2SO_4/H_2O$ solution were added. Over 2.5 hours, 72 ml (0.70 mol) of 30 percent $H_2O_2$ was added while the temperature was maintained at 30°-35°. The layers were separated, the n-hexane layer was dried over anhydrous $MgSO_4$, filtered and stripped to an oil using a rotory evaporator and water aspirator. The product (0.012 mol, 1.5g of $B_{10}H_{14}$) was sublimed from the oil in vacuo.

EXAMPLE 6

Synthesis of Decaborane (14) From $NaB_{11}H_{14}.n$ $C_6H_{14}O_3$ Using $H_2O_2$/Fe (II) Oxidant To a 500 ml, four-neck flask fitted with a mechanical stirrer, thermometer, gas outlet bubbler and an addition funnel was placed 22.7g (0.054 mol) of $NaB_{11}H_{14}.nC_6H_{14}O_3$ and 50 ml of water. To the stirred solution was added 150 ml of n-hexane followed by 32 ml of cool 1:1 $H_2SO_4/H_2O$ solution and 2.0g of $FeSO_4.7H_2O$. The mixture was warmed to 30° and 25 ml (0.24 mol) of 30 percent $H_2O_2$ was added over 3.4 hours. When the addition was complete the mixture was separated and the aqueous layer was washed with 50 ml of n-hexane. The combined n-hexane fractions were dried over anhydrous $MgSO_4$ and filtered. Colorimetric analysis of the n-hexane solution indicated the presence of 0.026 mol, 3.2g of decaborane (14).

EXAMPLE 7

Synthesis of Decaborane (14) from $NaB_{11}H_{14}.2.5$ dioxane by Reaction with Ce(IV) Oxidant $NaB_{11}H_{14}.2.5$ dioxane is prepared by the method of H. C. Miller et al. [Inorganic Chemistry, Vol. 3, No. 10, 1458 (1964)] as follows: A 400 ml. stainless steel reactor is charged with 2.54g. (0.067 mole) of sodium borohydride, 4.6g (0.166 mole) of diborane, and 25 ml dioxane. The reactor is heated to 80° C for 10 hours. After venting the residual diborane, the contents are added to 250 ml dimethoxyethane and thereafter filtered. Upon addition of several volumes of dioxane to the filtrate, the product $NaB_{11}H_{14}.2.5$ dioxane is precipitated and isolated by filtration. Into a 1000 ml, 3-necked flask fitted with mechanical stirring and an addition funnel is placed 3.76g (0.01 mol) of $NaB_{11}H_{14}.2.5$ $C_4H_8O_2$ product and 15 ml of water. A cooled solution of 15 ml of concentrated $H_2SO_4$ and 15 ml of water is added followed by 50 ml of cyclohexane. Over 3 hours a solution of $Ce(HSO_4)_4$ (0.1 mol, 400 ml of 0.25 molar) is added from the additional funnel. When the addition is complete the layers are separated and the cyclohexane layer is dried over anhydrous $MgSO_4$, filtered and stripped to an oil using a rotary evaporator. The product, decaborane (14), is sublimed in vacuo from the oil.

Decaborane (14) prepared by the process of this invention is a useful precursor to various boranes including carboranes. The carboranes themselves are useful for the synthesis of carborane-siloxane polymers and elastomeric gum stocks which have attractive applications as sealants and the like. The carborane derivatives are also useful as rocket propellant additives.

What is claimed is:

1. Process for preparing decaborane (14) which comprises contacting and oxidizing tetradecahydroundecaborate (−1) ions at a temperature between −10° and 50° C with an oxidizing agent having an electrode potential (E°) of at least +0.6 volts.

2. Process according to claim 1 wherein the tetradecahydroundecaborate (−1) ions are imparted to the reaction mixture in the form of at least one compound having the formula $MB_{11}H_{14}$ wherein M represents a cation selected from the group consisting of alkali metals and alkyl-substituted ammonium groups and the oxidation reaction is carried out in an aqueous medium.

3. Process according to claim 1 wherein the oxidizing agent has an electrode potential (E°) of at least +1.0.

4. Process according to claim 3 wherein the oxidizing agent is hydrogen peroxide.

5. Process according to claim 3 wherein the oxidizing agent is sodium dichromate.

6. Process according to claim 3 wherein the oxidizing agent is potassium permanganate.

7. Process according to claim 3 wherein the oxidizing agent is a combination of $H_2O_2$ and $Fe^{++}$ ions.

* * * * *